United States Patent
Yu et al.

(10) Patent No.: US 12,514,915 B2
(45) Date of Patent: Jan. 6, 2026

(54) **VACCINES AND RELATED METHODS FOR TREATMENT OF *PSEUDOMONAS* BACTERIAL INFECTIONS**

(71) Applicant: Marshall University Research Corporation, Huntington, WV (US)

(72) Inventors: Hongwei D. Yu, Huntington, WV (US); Meagan E. Valentine, Huntington, WV (US); Brandon D. Kirby, Huntington, WV (US); Richard M. Niles, Huntington, WV (US)

(73) Assignee: MARSHALL UNIVERSITY RESEARCH CORPORATION, Huntington, WV (US)

( * ) Notice: Subject to any disclaimer, the term of this patent is extended or adjusted under 35 U.S.C. 154(b) by 717 days.

(21) Appl. No.: 17/775,468

(22) PCT Filed: Nov. 6, 2020

(86) PCT No.: PCT/US2020/059453
§ 371 (c)(1),
(2) Date: May 9, 2022

(87) PCT Pub. No.: WO2021/092417
PCT Pub. Date: May 14, 2021

(65) Prior Publication Data
US 2022/0395568 A1    Dec. 15, 2022

Related U.S. Application Data

(60) Provisional application No. 62/932,940, filed on Nov. 8, 2019.

(51) Int. Cl.
*A61K 39/104* (2006.01)
*A61K 39/00* (2006.01)
*A61P 31/04* (2006.01)

(52) U.S. Cl.
CPC ............ *A61K 39/104* (2013.01); *A61P 31/04* (2018.01); *A61K 2039/522* (2013.01); *A61K 2039/545* (2013.01)

(58) Field of Classification Search
CPC .................................................. A61K 39/104
See application file for complete search history.

(56) References Cited

U.S. PATENT DOCUMENTS 8,183,026 B2    5/2012   Lawrence et al.
2008/0274136 A1  11/2008  Ma et al.
2014/0294930 A1  10/2014  Nizet et al.

FOREIGN PATENT DOCUMENTS

WO    WO-2019178395 A1 *  9/2019  ............ C07K 14/21

OTHER PUBLICATIONS

The Cleveland Clinic, https://my.clevelandclinic.org/health/diseases/25164-pseudomonas-infection; accessed on Feb. 19, 2025 (Year: 2025).*
Bankevich, A., et al. "SPAdes: A New Genome Assembly Algorithm and Its Applications to Single-Cell Sequencing," Journal of Computational Biology, vol. 19, No. 5, 2012, pp. 455-477.
Damron, F.H., et al. "The Pseudomonas aeruginosa Sensor Kinase KinB Negatively Controls Alginate Production through AlgW-Dependent MucA Proteolysis," Journal of Bacteriology, Apr. 2009, pp. 2285-2295.
De Kievit, T.R., et al. "Molecular cloning and characterization of the rfc gene of Pseudomonas aeruginosa (serotype O5)," Molecular Microbiology, 1995 16(3), pp. 565-574.
Driscoll, J.A., "The Epidemiology, Pathogenesis and Treatment of Pseudomonas aeruginosa Infections," Drugs 2007 67(3), pp. 351-368.
Essar, D.W., et al. "Identification and Characterization of Genes for a Second Anthranilate Synthase in Pseudomonas aeruginosa: Interchangeability of the Two Anthranilate Synthases and Evolutionary Implications," Journal of Bacteriology, 1990, vol. 172, No. 2, pp. 884-900.
Figurski, D.H., et al. "Replication of an origin-containing derivative of plasmid RK2 dependent on a plasmid function provided in trans," Proc. Natl. Acad. Sci USA, vol. 76, No. 4, pp. 1648-1652, Apr. 1979.
Fomsgaard, A., et al. "Modification of the Silver Staining Technique To Detect Lipopolysaccharide in Polyacrylamide Gels," Journal of Clinical Microbiology, Dec. 1990, vol. 28, No. 12, pp. 2627-2631.
Gellatly, S.L., et al. "Pseudomonas aeruginosa: new insights into pathogenesis and host defenses," Pathogens and Disease, 2013, 67, pp. 159-173.
United States Patent and Trademark Office, International Search Report issued in corresponding Application No. PCT/US2020/059453 mailed Feb. 25, 2021.
European Patent Office, Examination Report issued in corresponding Application No. 20885994.2 dated Nov. 13, 2024.
Zaidi, T.S., et al. "A Live-Attenuated Pseudomonas aeruginosa Vaccine Elicits Outer Membrane Protein-Specific Active and Passive Protection against Corneal Infection," Infection and immunity, vol. 74, No. 2, Feb. 1, 2006 (Feb. 1, 2006), pp. 975-983.
Priebe, G.P., "Protection against fatal Pseudomonas aeruginosa pneumonia in mice after nasal immunization with a live, attenuated aroA deletion mutant," Infection And Immunity, American Society For Microbiology, US, vol. 71, No. 3, Mar. 1, 2003 (Mar. 1, 2003), pp. 1453-1461.

(Continued)

*Primary Examiner* — Brian Gangle
*Assistant Examiner* — Lakia J Jackson-Tongue
(74) *Attorney, Agent, or Firm* — Stites & Harbison, PLLC; Terry L. Wright

(57) ABSTRACT

Methods of treating a *Pseudomonas* bacterial infection and/or eliciting an immune response in a subject are provided and include administering to the subject a vaccine including a modified *Pseudomonas* bacterium missing or deficient in alpha-1,3-rhamnosyltransferase and/or one or more other virulence factors. Vaccines comprising a modified *Pseudomonas* bacterium missing or deficient in alpha-1,3-rhamnosyltransferase are further provided.

13 Claims, 3 Drawing Sheets

Specification includes a Sequence Listing.

(56) References Cited

OTHER PUBLICATIONS

Priebe, G.P., "Construction and Characterization of a Live, Attenuated aroA Deletion Mutant of Pseudomonas aeruginosa as a Candidate Intranasal Vaccine," Infection and Immunity, vol. 70, No. 3, Mar. 1, 2002 (Mar. 1, 2002), pp. 1507-1517.
European Patent Office, Search Report issued in corresponding Application No. 20885994.2 dated Nov. 3, 2023.

* cited by examiner

VACCINES AND RELATED METHODS FOR TREATMENT OF *PSEUDOMONAS* BACTERIAL INFECTIONS

RELATED APPLICATIONS

This application claims priority from U.S. Provisional Application Ser. No. 62/932,940, filed Nov. 8, 2019, the entire disclosure of which is incorporated herein by this reference.

GOVERNMENT INTEREST

This invention was made with government support under grant number R44GM113545 awarded by the National Institutes of Health. The government has certain rights in the invention.

TECHNICAL FIELD

The presently-disclosed subject matter generally relates to vaccines and related methods for treating *Pseudomonas* bacterial infections. In particular, certain embodiments of the presently-disclosed subject matter relate to vaccines and related methods for treating *Pseudomonas* bacterial infections, such as *Pseudomonas aeruginosa* infections, that make use of a modified *Pseudomonas* bacterium missing or deficient in one or more virulence factors.

BACKGROUND

*Pseudomonas aeruginosa* is a gram-negative bacteria that is frequently regarded as an opportunistic pathogen that takes advantage of an individual's weakened immune system to create an infection and, in turn, produces tissue-damaging toxins. Indeed, *Pseudomonas aeruginosa* has caused infections ranging from urinary tract infections, respiratory system infections, dermatitis, soft tissue infections, bacteremia, bone and joint infections, gastrointestinal infections and a variety of systemic infections, particularly in patients with severe burns and in cancer and AIDS patients who are immunosuppressed.

Cell walls of bacteria such as *Pseudomonas aeruginosa* contain many different types of polysaccharides, some of which are highly immunogenic. One group of such polysaccharides present in Gram-negative bacterial cell walls are known as O polysaccharides, also referred to as O antigens, which have many repeating sugar side chains that are the basis of the serotyping in the Gram negative bacteria. The O antigens are located on the outer most leaflet of the bacterial cell walls and are the first bacterial structure that interacts with host cells, such as the host's immune cells. Therefore, the diversity in these structures makes a universal vaccine difficult to develop. The other problem for vaccine development is that polysaccharides, unlike proteins, do not undergo antigen presentation by the immune B and T cells. So, the immune response is generally IgM, not IgG. The inability for the bacterial polysaccharide antigens to induce the class switching of the B cells from production of the low-affinity IgM to the high-affinity IgG is the major challenge for the vaccine development. Therefore, any polysaccharide-based vaccine will generally have only a short-term efficacy and lack the memory B and T cells. An example of such short-term efficacy is the Pneumococcal polysaccharide vaccine (PPSV23), which is made up with a mixture of 23 types of polysaccharides from the Gram positive bacterium *Streptococcus pneumoniae*. The people with a high risk for community acquired pneumonia receives PPSV23 every year because of the short-term efficacy with polysaccharide-based vaccine (PPSV23).

With further respect to *Pseudomonas aeruginosa*, and of particular note in livestock, *Pseudomonas aeruginosa* is a bacterium capable of causing mastitis in cows (i.e., bovine mastitis) as it is a bacterium commonly found in the environment, e.g. soil, water and other moist locations in farming environments, and generally requires few nutrients to grow and multiply. Water supplies of all types (wells, troughs, ponds, parlor wash hoses, and sprinkler pens), contaminated teat dips, and contaminated drug and infusion equipment are often sources of *Pseudomonas aeruginosa* on farms, and it is further appreciated that *Pseudomonas aeruginosa* may be found in waste feed, soil, manure, and animal skin. The presence of unsanitary housing and bedding conditions can also contribute to occasional outbreaks of *Pseudomonas aeruginosa* infections in farming environments.

Once established, *Pseudomonas aeruginosa* infections often present a difficult challenge from a treatment standpoint as the bacteria are frequently resistant to many commonly-used antibiotics. Although some strains are susceptible to antibiotics such as gentamicin, tobramycin, colistin, and amikacin, resistant forms have often developed and a combination of gentamicin and carbenicillin is frequently required to treat severe *Pseudomonas* infections. Moreover, while several types of vaccines have been tested, no vaccines are currently available for general use, either in human or animal populations. Accordingly, a vaccine and/or method for treating *Pseudomonas aeruginosa* infections would be both highly desirable and beneficial.

SUMMARY

The presently-disclosed subject matter meets some or all of the above-identified needs, as will become evident to those of ordinary skill in the art after a study of information provided in this document.

This summary describes several embodiments of the presently-disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this summary or not. To avoid excessive repetition, this summary does not list or suggest all possible combinations of such features.

The presently-disclosed subject matter provides, in some embodiments, vaccines and related methods for treating *Pseudomonas* bacterial infections, such as *Pseudomonas aeruginosa* infections, that make use of a modified *Pseudomonas* bacterium missing or deficient in one or more virulence factors. In some embodiments, a method of treating a *Pseudomonas* bacterial infection and/or eliciting an immune response is provided that comprises administering to a subject a vaccine including a modified *Pseudomonas* bacterium missing or deficient in alpha-1,3-rhamnosyltransferase. In some embodiments, the modified *Pseudomonas* bacterium is a modified *Pseudomonas aeruginosa* bacterium. In some embodiments, the *Pseudomonas* bacterial infection is a *Pseudomonas aeruginosa* infection. In some embodiments, the *Pseudomonas* bacterial infection is selected from bovine mastitis, a urinary tract infection, and/or conjunctivitis.

In some embodiments, the modified *Pseudomonas* bacterium may be missing or deficient in alpha-1,3-rhamnosyltransferase alone or may be missing or deficient in one or more additional virulence factors. For instance, in some embodiments, the modified *Pseudomonas* bacterium utilized in the vaccines and methods described herein is a modified *Pseudomonas* bacterium missing or deficient in alpha-1,3-rhamnosyltransferase and one or more virulence factors selected from the group consisting of exotoxin A, hemolytic phospholipase C, phenazine-specific methyltransferase, and 3-phoshoshikimate 1-carboxyvinyltransferase. In some embodiments, the modified *Pseudomonas* bacterium is missing or deficient in exotoxin A, hemolytic phospholipase C, phenazine-specific methyltransferase, alpha-1,3-rhamnosyltransferase, and 3-phoshoshikimate 1-carboxyvinyltransferase.

To administer a modified *Pseudomonas* bacterium in accordance with the presently-disclosed subject matter, in some embodiments, administering the modified *Pseudomonas* bacterium comprises intraperitoneally administering the modified *Pseudomonas* bacterium. In some embodiments, the modified *Pseudomonas* bacterium that is administered is a live bacterium. In some embodiments, a first dose of the modified *Pseudomonas* bacterium can be administered at a first time point and a second dose of the modified *Pseudomonas* bacterium can be administered at a second time point. In some embodiments, administering the modified *Pseudomonas* bacterium comprises administering the modified *Pseudomonas* bacterium subsequent to an onset of a *Pseudomonas* bacterial infection. In some embodiments, the modified *Pseudomonas* bacterium is administered with an adjuvant.

Further provided, in some embodiments of the presently-disclosed subject matter are vaccine compositions. In some embodiments, a vaccine composition is provided that comprises a modified *Pseudomonas* bacterium of the presently-disclosed subject matter, such as a modified *Pseudomonas* bacterium missing or deficient in alpha-1,3-rhamnosyltransferase. In some embodiments, the vaccine composition further comprises a pharmaceutically-acceptable vehicle, carrier, or excipient. In some embodiments, the modified *Pseudomonas* bacterium included in the vaccine compositions is a modified *Pseudomonas aeruginosa* bacterium. In some embodiments, the modified *Pseudomonas* bacterium included in the vaccine is a live bacterium. In some embodiments, the vaccine further comprises an adjuvant.

Further features and advantages of the present invention will become evident to those of ordinary skill in the art after a study of the description, figures, and non-limiting examples in this document.

BRIEF DESCRIPTION OF THE SEQUENCE LISTING

Figure 1:
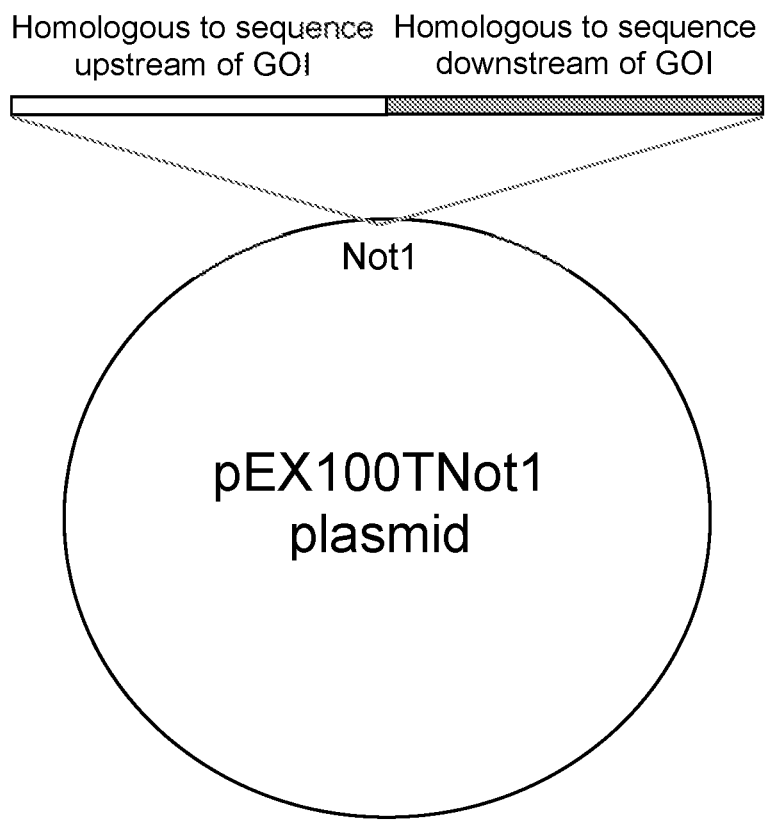
FIG. 1 is a schematic diagram showing a pEX100TNot1 plasmid utilized for deletion of various genes in a *Pseudomonas* bacterium in accordance with the presently-disclosed subject matter.

SEQ ID NO: 1 is a forward polymerase chain reaction (PCR) primer used to confirm deletion of a toxA gene;

SEQ ID NO: 2 is a reverse PCR primer used to confirm deletion of a toxA gene;

SEQ ID NO: 3 is a forward PCR primer used to confirm deletion of a plcH gene;

SEQ ID NO: 4 is a reverse PCR primer used to confirm deletion of a plcH gene;

SEQ ID NO: 5 is a forward PCR primer used to confirm deletion of a phzM gene;

SEQ ID NO: 6 is a reverse PCR primer used to confirm deletion of a phzM gene;

SEQ ID NO: 7 is a forward PCR primer used to confirm deletion of a wapR gene;

SEQ ID NO: 8 is a reverse PCR primer used to confirm deletion of a wapR gene;

SEQ ID NO: 9 is a forward PCR primer used to confirm deletion of a aroA gene; and SEQ ID NO: 10 is a reverse PCR primer used to confirm deletion of a aroA gene.

DESCRIPTION OF EXEMPLARY EMBODIMENTS

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

While the terms used herein are believed to be well understood by those of ordinary skill in the art, certain definitions are set forth to facilitate explanation of the presently-disclosed subject matter.

Unless defined otherwise, all technical and scientific terms used herein have the same meaning as is commonly understood by one of skill in the art to which the invention(s) belongs.

All patents, patent applications, published applications and publications, GenBank sequences, databases, websites and other published materials referred to throughout the entire disclosure herein, unless noted otherwise, are incorporated by reference in their entirety.

Where reference is made to a URL or other such identifier or address, it understood that such identifiers can change and particular information on the internet can come and go, but equivalent information can be found by searching the internet. Reference thereto evidences the availability and public dissemination of such information.

As used herein, the abbreviations for any protective groups, amino acids and other compounds, are, unless indicated otherwise, in accord with their common usage, recognized abbreviations, or the IUPAC-IUB Commission on Biochemical Nomenclature (see, Biochem. (1972) 11(9): 1726-1732).

Although any methods, devices, and materials similar or equivalent to those described herein can be used in the practice or testing of the presently-disclosed subject matter, representative methods, devices, and materials are described herein.

Sequences described herein may be described with reference to GENBANK® accession numbers and/or SWISSPROT identification numbers. The sequences cross-referenced in the GENBANK® and SWISSPROT databases are expressly incorporated by reference as are equivalent and related sequences present in GENBANK®, SWISSPROT, or other public databases. Also expressly incorporated herein by reference are all annotations present in the GENBANK®, and SWISSPROT databases associated with the sequences disclosed herein. Unless otherwise indicated or apparent the references to the GENBANK® database and the SWISSPROT database are references to the most recent version of the database as of the filing date of this Application.

The present application can "comprise" (open ended), "consist of" (closed ended), or "consist essentially of" the components of the present invention as well as other ingredients or elements described herein. As used herein, "comprising" is open ended and means the elements recited, or their equivalent in structure or function, plus any other element or elements which are not recited. The terms "having" and "including" are also to be construed as open ended unless the context suggests otherwise.

Following long-standing patent law convention, the terms "a", "an", and "the" refer to "one or more" when used in this application, including the claims. Thus, for example, reference to "a cell" includes a plurality of such cells, and so forth.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, "optional" or "optionally" means that the subsequently described event or circumstance does or does not occur and that the description includes instances where said event or circumstance occurs and instances where it does not. For example, an optionally variant portion means that the portion is variant or non-variant.

The presently-disclosed subject matter is based, at least in part, on the use of a genetic engineering approach to develop a vaccine that removes genes required for O antigen biosynthesis from the bacterial chromosome (namely, alpha-1,3-rhamnosyltransferase or wapR). Without wishing to be bound by any particular theory or mechanism, it is believed that deletion of this gene renders the synthesis of O polysaccharides severely compromised, thus allowing the immune cells of a host to better target the bacterial protein antigens. In particular, and as described in further detail below, it has been found that immunization with an O5 deficient bacteria confers protection to challenges by both O5-serotype and O1-serotypes of *Pseudomonas aeruginosa*, indicating that this method of vaccine development by bypassing the O-antigens through a genetic engineering is a valid and effective approach. Moreover, in some embodiments, it is believed that removing the polysaccharides coat from bacteria through genetic engineering can allow the host immune system to process protein antigens for long-term protection against infection.

The presently-disclosed subject matter thus includes vaccines and related methods for treating *Pseudomonas* bacterial infections, such as *Pseudomonas aeruginosa* infections, that make use of a modified *Pseudomonas* bacterium missing or deficient in alpha-1,3-rhamnosyltransferase. In some embodiments, a vaccine composition is provided that comprises a modified *Pseudomonas* bacterium missing or deficient in alpha-1,3-rhamnosyltransferase. In some embodiments, reference to alpha-1,3-rhamnosyltransferase is inclusive of naturally-occurring alpha-1,3-rhamnosyltransferase proteins, as well as homologs, orthologs, paralogs, fragments and other functional bioequivalents, variants, and/or analogs of thereof.

In some embodiments of the presently-disclosed subject matter, a vaccine composition is provided that comprises a modified *Pseudomonas aeruginosa* bacterium. In some embodiments, a vaccine composition is provided that comprises a modified *Pseudomonas* bacterium missing or deficient in alpha-1,3-rhamnosyltransferase and one or more other virulence factors naturally found in the bacterium. The term "virulence factor" is used herein to refer to molecules, such as polypeptides, that are produced by bacteria, as well as viruses, fungi, and protozoa, and which enable those organisms to achieve certain functions including, but not limited to, the ability of those organisms to achieve colonization in a particular host such as by attachment to the cells of the host, to evade or inhibit a host's immune response, to gain entry into and exit from the cells of the host, and/or to obtain nutrition from the host. Such virulence factors can vary widely depending on the particular organism and each particular organism can include a wide array of virulence factors from a variety of different sources. In bacteria, for example, such virulence factors can include factors that assist and promote colonization of the host, such as adhesins, invasins, and antiphagocytic factors, as well as factors that damage the host, either directly or indirectly, such as toxins, hemolysins, and proteases. Such virulence factors can be chromosomally encoded and intrinsic to the bacteria (e.g. capsules and endotoxin), while other virulence factors in bacteria can be obtained from mobile genetic elements like plasmids and bacteriophages (e.g. some exotoxins).

In some embodiments, the virulence factors missing or deficient in the modified bacterium of the presently-disclosed subject matter are polypeptides selected from: exotoxin A (GenBank reference AAG04537.1), which inhibits protein synthesis in the host by deactivating elongation factor 2 (EF-2); hemolytic phospholipase C (GenBank reference AAG04233.1), which acts as a surfactant and damages host cell membranes; phenazine-specific methyltransferase (GenBank reference AAG07596.1), which is an enzyme required for the production of the redox active, pro-inflammatory, blue-green secreted pigment, pyocyanin; alpha-1,3-rhamnosyltransferase (GenBank reference AAG08385.1), which is involved in synthesizing O-antigen, a component of lipopolysaccharide (LPS) of the outer membrane of the *Pseudomonas* organism; and 3-phosphoshikimate 1-carboxyvinyltransferase (GenBank reference AE004091.2), which is required intracellularly for aromatic amino acid synthesis; and combinations thereof.

In some embodiments, the modified bacteria are missing or deficient in at least one of the foregoing virulence factors, while, in other embodiments, the modified bacteria are missing or are deficient in two or more of the foregoing virulence factors. In some embodiments, such modified bacteria that are missing or deficient in two or more of the virulence factors are generated via the sequential deletion of the genes encoding the virulence factors. For instance, in some embodiments, a modified *Pseudomonas aeruginosa* bacterium is provided that is missing or deficient in only exotoxin A and is referred to herein as PGN1. In another embodiment, the modified *Pseudomonas aeruginosa* bacterium that is missing or deficient in exotoxin A is further modified such that it is missing or deficient in hemolytic phospholipase C as well and is referred to herein as PGN2. That bacterium, in further embodiments, is then modified to be missing or deficient in phenazine-specific methyltransferase and is referred to herein as PGN3. In yet further embodiments, the PGN3 bacterium is then additionally modified such that it is missing or deficient in four virulence factors, namely exotoxin A, hemolytic phospholipase C, phenazine-specific methyltransferase, and alpha-1,3-rhamnosyltransferase, and is referred to herein as PGN4. Even further, in other embodiments, a modified *Pseudomonas aeruginosa* bacterium is then produced that is missing or deficient in five virulence factors, exotoxin A, hemolytic phospholipase C, phenazine-specific methyltransferase, alpha-1,3-rhamnosyltransferase, and 3-phosphoshikimate 1-carboxyvinyltransferase, and is referred to herein as PGN5. For further explanation and guidance regarding modified *Pseudomonas aeruginosa* bacteria missing or deficient in virulence factors, see, e.g., International Patent Application No. PCT/US19/22330, which is incorporated herein by reference in its entirety.

With further regard to the bacteria missing or deficient in virulence factors, the term "missing" is used herein to refer to modified bacteria in which certain virulence factors are absent or otherwise incapable of detection in the bacteria, while the term "deficient" is used to refer to modified bacteria in which the amount or activity level of the virulence factors is decreased as compared to the amount or activity level of the virulence factors typically found in wild-type bacteria. In this regard, the term "modification" or "modified" when used in reference to a bacterium of the presently-disclosed subject matter refers to a bacterium in which there has been a modification of a sequence of amino acids of a polypeptide of the bacteria or a sequence of nucleotides in a nucleic acid molecule of the bacteria, and can thus include deletions, insertions, and replacements of amino acids and nucleotides, respectively.

As used herein, "deletion," when referring to a nucleic acid molecule or polypeptide, refers to the deletion of one or more nucleotides from the nucleic acid molecule or deletion of one or more amino acids from the polypeptide compared to a sequence, such as a target polynucleotide or polypeptide or a native or wild-type sequence. "Insertion," on the other hand, when referring to a nucleic acid molecule or polypeptide, describes the inclusion of one or more additional nucleotides in the nucleic acid molecule or one or more amino acids in the polypeptide, within a target, native, wild-type or other related sequence. Thus, a nucleic acid molecule that contains one or more insertions compared to a wild-type sequence, contains one or more additional nucleotides within the linear length of the sequence. In some embodiments, the term "additions" is further used to describe the addition of nucleotides or amino acids onto either termini compared to another nucleic acid molecule or polypeptide.

As used herein, "substitution" or "replacement" refers to the replacing of one or more nucleotides or amino acids in a native, target, wild-type or other nucleic acid molecule or polypeptide sequence with an alternative nucleotide or amino acid, without changing the length (as described in numbers of residues) of the molecule. Thus, one or more substitutions in a molecule does not change the number of amino acid residues or nucleotides of the molecule. Substitution mutations compared to a particular polypeptide can be expressed in terms of the number of the amino acid residues along the length of the polypeptide sequence. For example, a modified polypeptide having a modification in the amino acid at the 19th position of the amino acid sequence that is a substitution of Isoleucine (Ile; I) for cysteine (Cys; C) can be expressed as I19C, Ile19C, or simply C19, to indicate that the amino acid at the modified 19th position is a cysteine. In this example, the molecule having the substitution has a modification at Ile 19 of the unmodified polypeptide.

Various methods of modifying a polypeptide or a nucleic acid (e.g., a gene of interest) are routine to those of skill in the art, such as by using recombinant DNA methodologies, direct synthesis, and the like. In some embodiments, the modification that results in a missing or deficient virulence factor includes mutations that result in alterations in protein coding sequences, e.g., mutations that result in premature termination codons and/or mutations that result in nonfunctional proteins and/or mutations that delete the gene completely. In some embodiments, the modification that results in a missing or deficient virulence factor include mutations that affect regulator sequences and reduce transcription or translation of the virulence factors themselves or other factors that regulate the transcription or translation of the virulence factors.

In some embodiments, the modification that results in a missing or deficient virulence factor includes an in frame deletion of the gene encoding a particular virulence factor. For instance, in some embodiments, to perform such in frame deletions, plasmid inserts can first be generated by PCR-amplification of a nucleotide sequence directly upstream and of a nucleotide sequence directly downstream of each gene encoding a particular virulence factor, followed by fusion of these DNA fragments via crossover PCR. The resultant PCR product can then be digested and ligated into a suitable plasmid before the plasmid carrying its specific insert is introduced into a bacterium. Once the bacterium is transformed with the plasmid, the target gene can then be deleted with a two-step allelic exchange procedure whereby homologous recombination between one site on the plasmid and its target site on the chromosome of the bacterium integrates the plasmid into the chromosome (i.e., a single-crossover event). Such single-crossovers can then be selected by plasmid-conferred resistance to an antibiotic and/or sensitivity to 10% (w/v) sucrose supplemented in PIA. Single-crossovers can then be grown overnight to allow for homologous recombination between the second site on the plasmid with its target site on the chromosome (i.e., a double-crossover event), which removes the entire plasmid sequence along with the target gene sequence. Those double-crossovers can then be selected by plasmid conferred-sensitivity, indicating that the plasmid sequence has been removed.

With further regard to the deletion of virulence genes in accordance with the presently-disclosed subject matter, in some embodiments, a modified bacterium includes a deletion of two or more virulence factor genes. In some embodiments, such virulence factor genes are selected from: toxA (GenBank reference AAG04537.1), which encodes the secreted toxin exotoxin A; plcH (GenBank reference AAG04233.1), which encodes the secreted toxin hemolytic phospholipase C; phzM (GenBank reference AAG07596.1), which encodes phenazine-specific methyltransferase; wapR (GenBank reference AAG08385.1), which encodes the rhamnosyltransferase involved in synthesizing O-antigen; aroA (GenBank reference AE004091.2), which encodes 3-phosphoshikimate 1-carboxyvinyltransferase; and combinations thereof.

The term "gene" is used broadly herein to refer to any segment of DNA associated with a biological function. Thus, genes include, but are not limited to, coding sequences and/or the regulatory sequences required for their expression. Genes can also include non-expressed DNA segments that, for example, form recognition sequences for a polypeptide. Genes can be obtained from a variety of sources, including cloning from a source of interest or synthesizing from known or predicted sequence information, and can include sequences designed to have desired parameters.

The term "nucleic acid" refers to deoxyribonucleotides or ribonucleotides and polymers thereof in either single- or double-stranded form. Unless specifically limited, the term encompasses nucleic acids containing known analogues of natural nucleotides that have similar binding properties as the reference nucleic acid and are metabolized in a manner similar to naturally-occurring nucleotides. Unless otherwise indicated, a particular nucleic acid sequence also implicitly encompasses conservatively modified variants thereof (e.g., degenerate codon substitutions) and complementary sequences and as well as the sequence explicitly indicated.

The term "isolated", when used in the context of an isolated nucleic acid molecule, an isolated polypeptide, or even an isolated bacterium is a nucleic acid molecule, polypeptide, or bacterium that, by the hand of man, exists apart from its native environment and is therefore not a product of nature. An isolated nucleic acid molecule or polypeptide can exist in a purified form or can exist in a non-native environment such as, for example, in a transgenic host cell (e.g., a bacterial cell).

The terms "polypeptide," "protein," and "peptide" are used interchangeably herein, refer to a polymer of the 10 protein amino acids, or amino acid analogs, regardless of its size or function. Although "protein" is often used in reference to relatively large polypeptides, and "peptide" is often used in reference to small polypeptides, usage of these terms in the art overlaps and varies. The term "polypeptide" as used herein refers to peptides, polypeptides, and proteins, unless otherwise noted. The terms "protein", "polypeptide" and "peptide" are used interchangeably herein when referring to a gene product. Thus, exemplary polypeptides include gene products, naturally occurring proteins, homologs, orthologs, paralogs, fragments and other equivalents, variants, and analogs of the foregoing.

With further respect to the vaccine compositions including the modified bacteria described herein, in some embodiments, the vaccine composition further comprises a pharmaceutically-acceptable vehicle, carrier, or excipient. The term "pharmaceutically-acceptable carrier" as used herein refers to aqueous or nonaqueous solutions, dispersions, suspensions, or emulsions, as well as powders for reconstitution into injectable solutions or dispersions just prior to use. Proper fluidity can be maintained, for example, by the use of coating materials such as lecithin, by the maintenance of the required particle size in the case of dispersions and by the use of surfactants. In some embodiments, these vaccine compositions can also contain adjuvants, such as preservatives, wetting agents, emulsifying agents and dispersing agents. Adjuvants such as incomplete Freund's adjuvant, aluminum phosphate and aluminum hydroxide are materials well known in the art. Other adjuvants useful with the presently-described vaccines may include, but are not limited to, QS-21, Detox-PC, MPL-SE, MoGM-CSF, TiterMa.x-G, CRL-1005, GERBU, TERamide, PSC97B, Adjumer, PG-026, GSK-1, GcMAF, B-alethine, MPC-026, Adjuvax, CpG ODN, Betafectin, Alum, AS04 and MF59 (see Kim et al. Vaccine 199918:597-603 and references therein). In some embodiments, it can also be desirable to include isotonic agents such as sugars, sodium chloride and the like.

Suitable formulations can further include aqueous and non-aqueous injection solutions that can contain antioxidants, buffers, and solutes that render the formulation isotonic with the bodily fluids of the intended recipient; and aqueous and non-aqueous suspensions, which can include suspending agents and thickening agents.

The compositions can also take forms such as suspensions, solutions, or emulsions in oily or aqueous vehicles, and can contain formulatory agents such as suspending, stabilizing and/or dispersing agents. Alternatively, the compounds can be in powder form for constitution with a suitable vehicle, e.g., pyrogen-free water, before use.

The formulations can be presented in unit-dose or multi-dose containers, for example sealed ampoules and vials, and can be stored in a frozen or freeze-dried (lyophilized) condition requiring only the addition of liquid carrier immediately prior to use.

For oral administration, the compositions can take the form of, for example, tablets or capsules prepared by a conventional technique with pharmaceutically-acceptable excipients such as binding agents (e.g., pregelatinized maize starch, polyvinylpyrrolidone or hydroxypropyl methylcellulose); fillers (e.g., lactose, microcrystalline cellulose or calcium hydrogen phosphate); lubricants (e.g., magnesium stearate, talc or silica); disintegrants (e.g., potato starch or sodium starch glycollate); or wetting agents (e.g., sodium lauryl sulphate). The tablets can be coated by methods known in the art.

Liquid preparations for oral administration can take the form of, for example, solutions, syrups or suspensions, or they can be presented as a dry product for constitution with water or other suitable vehicle before use. Such liquid preparations can be prepared by conventional techniques with pharmaceutically-acceptable additives such as suspending agents (e.g., sorbitol syrup, cellulose derivatives or hydrogenated edible fats); emulsifying agents (e.g. lecithin or acacia); non-aqueous vehicles (e.g., almond oil, oily esters, ethyl alcohol or fractionated vegetable oils); and preservatives (e.g., methyl or propyl-p-hydroxybenzoates or sorbic acid). The preparations can also contain buffer salts, flavoring, coloring and sweetening agents as appropriate. Preparations for oral administration can be suitably formulated to give controlled release of the active compound. For buccal administration, the compositions can take the form of tablets or lozenges formulated in a conventional manner.

The compositions can also be formulated as a preparation for implantation or injection. Thus, for example, the compounds can be formulated with suitable polymeric or hydrophobic materials (e.g., as an emulsion in an acceptable oil) or ion exchange resins, or as sparingly soluble derivatives (e.g., as a sparingly soluble salt). The compounds can also be formulated in rectal compositions, creams or lotions, or transdermal patches.

Still further provided, in some embodiments of the presently-disclosed subject matter, are methods for treating a *Pseudomonas* bacterial infection, such as *Pseudomonas aeruginosa* infection, and/or for eliciting an immune response that comprise administering an effective amount of a vaccine composition including a modified *Pseudomonas* bacterium of the presently-disclosed subject matter. In some embodiments, the *Pseudomonas* bacterial infection is selected from bovine mastitis, urinary tract infections, and/or conjunctivitis.

As used herein, the terms "treating" or "treatment" relate to any treatment of a *Pseudomonas* bacterial infection including, but not limited to, therapeutic treatment and prophylactic treatment of a bacterial infection. With regard to therapeutic treatment of a *Pseudomonas* bacterial infection, the terms "treating" or "treatment" include, but are not limited to, inhibiting the progression of the infection, arresting the development of the infection, reducing the severity of the infection, ameliorating or relieving one or more symptoms associated with the infection, and causing a regression of the infection or one or more symptoms associated with an infection.

As noted herein above, the terms "treating" or "treatment," further include the prophylactic treatment of a bacterial infection, including, but not limited to, any action that occurs before the development of a bacterial infection. It is understood that the degree of prophylaxis need not be absolute (e.g. the complete prophylaxis of a bacterial infection such that the subject does not develop an infection at all), and that intermediate levels of prophylaxis, such as increasing the time required for at least one symptom resulting from an infection to develop, reducing the severity or spread of an infection in a subject, or reducing the time that at least one adverse health effect of an infection is present within a subject, are all examples of prophylactic treatment of a bacterial infection.

With respect to the elicitation of an immune response in accordance with the presently-disclosed subject matter, the phrase "eliciting an immune response" is used herein to refer to the evoking or bring about of a response by the immune system of a subject. Such immune responses can include, but are not limited to, a detectable alteration (e.g., increase) in Toll receptor activation, lymphokine (e.g., cytokine (e.g., Th1 or Th2 type cytokines) or chemokine) expression and/or secretion, macrophage activation, dendritic cell activation, T cell activation (e.g., CD4+ or CD8+ T cells), NK cell activation, and/or B cell activation (e.g., antibody generation and/or secretion). Additional examples of immune responses include binding of an immunogen (e.g., antigen (e.g., immunogenic polypeptide)) to an MHC molecule and inducing a cytotoxic T lymphocyte ("CTL") response, inducing a B cell response (e.g., antibody production), and/or T-helper lymphocyte response, and/or a delayed type hypersensitivity (DTH) response against the antigen from which the immunogenic polypeptide is derived, expansion (e.g., growth of a population of cells) of cells of the immune system (e.g., T cells, B cells (e.g., of any stage of development (e.g., plasma cells), and increased processing and presentation of antigen by antigen presenting cells. An immune response may be to immunogens that the subject's immune system recognizes as foreign (e.g., non-self antigens from microorganisms (e.g., pathogens), or self-antigens recognized as foreign). Thus, it is to be understood that, as used herein, "immune response" refers to any type of immune response, including, but not limited to, innate immune responses (e.g., activation of Toll receptor signaling cascade) cell-mediated immune responses (e.g., responses mediated by T cells (e.g., antigen-specific T cells) and non-specific cells of the immune system) and humoral immune responses (e.g., responses mediated by B cells (e.g., via generation and secretion of antibodies into the plasma, lymph, and/or tissue fluids). The term "immune response" is thus meant to encompass all aspects of the capability of a subject's immune system to respond to antigens and/or immunogens (e.g., both the initial response to an immunogen (e.g., a pathogen) as well as acquired (e.g., memory) responses that are a result of an adaptive immune response).

Suitable methods for administering a therapeutic composition in accordance with the methods of the presently-disclosed subject matter include, but are not limited to, systemic administration, parenteral administration (including intravascular, intramuscular, and/or intraarterial administration), oral delivery, buccal delivery, rectal delivery, subcutaneous administration, intraperitoneal administration, inhalation, intratracheal installation, surgical implantation, transdermal delivery, local injection, intranasal delivery, and hyper-velocity injection/bombardment. Where applicable, continuous infusion can enhance drug accumulation at a target site (see, e.g., U.S. Pat. No. 6,180,082). In some embodiments, the administration of the composition is via oral administration, transdermal administration, administration by inhalation, nasal administration, topical administration, intraaural administration, rectal administration, intravenous administration, intramuscular administration, subcutaneous administration, intravitreous administration, subconjunctival administration, intracameral administration, intraocular administration or combinations thereof. In some embodiments, the administration comprises intraperitoneal administration.

Regardless of the route of administration, the vaccine compositions of the presently-disclosed subject matter are typically administered in amount effective to achieve the desired response. As such, the term "effective amount" is used herein to refer to an amount of the therapeutic composition (e.g., a composition including a modified *Pseudomonas* bacterium of the presently-disclosed subject matter and a pharmaceutically vehicle, carrier, or excipient) sufficient to produce a measurable biological response (e.g., an immune response). Actual dosage levels of active ingredients in a therapeutic composition of the present invention can be varied so as to administer an amount of the active compound(s) that is effective to achieve the desired therapeutic response for a particular subject and/or application.

Of course, the effective amount in any particular case will depend upon a variety of factors including the activity of the therapeutic composition, formulation, the route of administration, combination with other drugs or treatments, severity of the condition being treated, and the physical condition and prior medical history of the subject being treated. Preferably, a minimal dose is administered, and the dose is escalated in the absence of dose-limiting toxicity to a minimally effective amount. Determination and adjustment of a therapeutically effective dose, as well as evaluation of when and how to make such adjustments, are known to those of ordinary skill in the art. In some embodiments, the vaccine compositions are administered as a first dose at a first time point and as one or more additional doses at one or more later time points (e.g., as boosters). In some embodiments, the vaccine compositions are administered subsequent to the onset of a bacterial infection. In further embodiments, the vaccine compositions are administered with an adjuvant to provide further immune response modulation. In some embodiments, the adjuvants are co-administered or sequentially administered with other immunologically active agents.

For additional guidance regarding formulation and dose, see U.S. Pat. Nos. 5,326,902; 5,234,933; PCT International Publication No. WO 93/25521; Berkow et al., (1997) The Merck Manual of Medical Information, Home ed. Merck Research Laboratories, Whitehouse Station, New Jersey; Goodman et al., (1996) Goodman & Gilman's the Pharmacological Basis of Therapeutics, 9th ed. McGraw-Hill Health Professions Division, New York; Ebadi, (1998) CRC Desk Reference of Clinical Pharmacology. CRC Press, Boca Raton, Florida; Katzung, (2001) Basic & Clinical Pharmacology, 8th ed. Lange Medical Books/McGraw-Hill Medical Pub. Division, New York; Remington et al., (1975) Remington's Pharmaceutical Sciences, 15th ed. Mack Pub. Co., Easton, Pennsylvania; and Speight et al., (1997) Avery's Drug Treatment: A Guide to the Properties, Choice, Therapeutic Use and Economic Value of Drugs in Disease Management, 4th ed. Adis International, Auckland/Philadelphia; Duch et al., (1998) Toxicol. Lett. 100-101:255-263.

As used herein, the term "subject" includes both human and animal subjects. Thus, veterinary therapeutic and prophylactic uses are provided in accordance with the presently-disclosed subject matter. As such, the presently-disclosed subject matter provides for the treatment of mammals such as humans, as well as those mammals of importance due to being endangered, such as Siberian tigers; of economic importance, such as animals raised on farms for consumption by humans; and/or animals of social importance to humans, such as animals kept as pets or in zoos. Examples of such animals include but are not limited to: carnivores such as cats and dogs; swine, including pigs, hogs, and wild boars; ruminants and/or ungulates such as cattle, oxen, sheep, giraffes, deer, goats, bison, and camels; and horses. Also provided is the treatment of birds, including the treatment of those kinds of birds that are endangered and/or kept in zoos, as well as fowl, and more particularly domesticated fowl, i.e., poultry, such as turkeys, chickens, ducks, geese, guinea fowl, and the like, as they are also of economic importance to humans. Thus, also provided is the treatment of livestock, including, but not limited to, domesticated swine, ruminants, ungulates, horses (including race horses), poultry, and the like.

The practice of the presently-disclosed subject matter can employ, unless otherwise indicated, conventional techniques of cell biology, cell culture, molecular biology, transgenic biology, microbiology, recombinant DNA, and immunology, which are within the skill of the art. Such techniques are explained fully in the literature. See e.g., Molecular Cloning A Laboratory Manual (1989), 2nd Ed., ed. by Sambrook, Fritsch and Maniatis, eds., Cold Spring Harbor Laboratory Press, Chapters 16 and 17; U.S. Pat. No. 4,683,195; DNA Cloning, Volumes I and II, Glover, ed., 1985; Oligonucleotide Synthesis, M. J. Gait, ed., 1984; Nucleic Acid Hybridization, D. Hames & S. J. Higgins, eds., 1984; Transcription and Translation, B. D. Hames & S. J. Higgins, eds., 1984; Culture Of Animal Cells, R. I. Freshney, Alan R. Liss, Inc., 1987; Immobilized Cells And Enzymes, IRL Press, 1986; Perbal (1984), A Practical Guide To Molecular Cloning; See Methods In Enzymology (Academic Press, Inc., N.Y.); Gene Transfer Vectors For Mammalian Cells, J. H. Miller and M. P. Calos, eds., Cold Spring Harbor Laboratory, 1987; Methods In Enzymology, Vols. 154 and 155, Wu et al., eds., Academic Press Inc., N.Y.; Immunochemical Methods In Cell And Molecular Biology (Mayer and Walker, eds., Academic Press, London, 1987; Handbook Of Experimental Immunology, Volumes I-IV, D. M. Weir and C. C. Blackwell, eds., 1986.

The presently-disclosed subject matter is further illustrated by the following specific but non-limiting examples. The following examples may include compilations of data that are representative of data gathered at various times during the course of development and experimentation related to the presently-disclosed subject matter.

EXAMPLES

Example 1—Modified *Pseudomonas aeruginosa* Strains

Bacterial strains, culture, plasmids, and oligonucleotides. Bacterial strains and plasmids utilized are listed in Table 1 and Table 2. *P. aeruginosa* strains were either grown on *Pseudomonas* isolation agar (PIA) plates or in *Pseudomonas* isolation broth (PIB) at 37° C. (Difco, Sparks, MD, USA). *E. coli* strains were cultured in Luria Broth (LB) or on LB with 1% agar at 37° C. (Difco, Sparks, MD, USA). When necessary, plates were supplemented with the following antibiotics: gentamicin or carbenicillin at a concentration of 300 μg/mL for *P. aeruginosa* and 30 μg/mL for *E. coli*; kanamycin at a concentration of 50 μg/mL for *E. coli*. PGN5 was grown on a medium supplemented with 1 mg/mL of the aromatic amino acids (Y, W, F) unless otherwise stated.

TABLE 1

Strains used.

| Strain | Genotype | Relevant Characteristics | Source |
|---|---|---|---|
| *Pseudomonas aeruginosa* strains | | | |
| PAO1 | Wild-type serogroup 05 | Non-mucoid, blue-green growth on PIA | (Kropinski, et al. 1979) |
| VE2 | PAO1 with chromosomal fusion of $P_{Gm}$-aacC1-mucE | Mucoid, blue-green growth on PIA | (Qiu, et al. 2007) |
| PA-103 | Serogroup O11 | Positive for Exotoxin A secretion | (Liu, P. V. 1966) |
| PGN4 | PAO1ΔtoxAΔplcHΔphzMΔwapR | Non-mucoid, greenish colonies on PIA | This study |
| PGN5 | PAO1ΔtoxAΔplcHΔphzMΔwapRΔaroA | Non-mucoid, white/tan colonies on PIA | This study |

TABLE 2

Plasmids used.

| Plasmid | Relevant characteristics | Source |
|---|---|---|
| pEX100T-NotI | *Pseudomonas* suicide vector with NotI restriction site fused into SmaI of pEX100T sacB oriT Cb$^R$ | (Damron et al., 2009) |
| pRK2013 | Helper plasmid for conjugation, Km$^R$ | (Figurski et al., 1979) |
| pUCP20-pGm-mucE | mucE over-expression under gentamicin promoter, Gm$^R$ | (Qiu et al., 2007) |
| pTNS2 | Helper plasmid; does not replicate in *P. aeruginosa*. Cb$^R$ | (Choi et al., 2006) |
| pUC18-mini-Tn7T-Gm-lux | *Pseudomonas* suicide vector that carries luxCDABE operon for insertion into attTn7 sites, Gm$^R$ | (Choi et al., 2006) |
| pFLP2 | Facilitates recombination between FRT sites, Cb$^R$ | (Choi et al., 2006) |

Gene deletions. Retrieval and analysis of *P. aeruginosa* gene sequences was performed using the *Pseudomonas* Genome Database website. For PGN5, five genes, toxA, plcH, phzM, wapR, and aroA were sequentially deleted from the chromosome of the wild-type *P. aeruginosa* strain PAO1. The pEX100T-NotI plasmid (FIG. 1) was used to mediate the in-frame marker-less deletion of each gene. This plasmid carries the genes ampR, which confers resistance to carbenicillin, and sacB (*B. subtilis*), which provides sucrose sensitivity. Plasmid inserts used to delete toxA, plcH, phzM, and wapR were generated by PCR-amplification of 500-1000 bp of sequence directly upstream and 500-1000 bp of sequence directly downstream of each target gene (Table 3), followed by fusion of these DNA fragments via crossover PCR. The resultant PCR product was digested and ligated into pEX100T-NotI. For in-frame deletion of aroA, about 800 bp of upstream sequence adjacent to about 900 bp of downstream sequence of the target gene was synthesized, digested, and ligated into pEX100T-NotI by the company GenScript (Piscataway, NJ, USA). Each of the final plasmids was transformed into OneShot™ TOP10 Electrocomp *E. coli* (Invitrogen, Carlsbad, CA, USA).

TABLE 3

Generation of in-frame deletion mutant of *P. aeruginosa*.

| Name | Genotype | PAO1 locus tag | Size (kb) | Missing gene product | Targeted virulence | Alginate |
|---|---|---|---|---|---|---|
| PGN1 | PAO1ΔtoxA | PA1148 | 1.9 | Exotoxin A | Major exotoxin | + |
| PGN2 | PGN1ΔplcH | PGN1 + PA0844 | 2.2 | Hemolytic phospholipase C | Membrane degrading enzyme | + |
| PGN3 | PGN2ΔphzM | PGN2 + PA4209 | 1.0 | Phenazine-specific methyltransferase | Pyocyanin (Pigment) | + |
| PGN4 | PGN3ΔwapR | PGN3 + PA5000 | 0.9 | Alpha-1,3-rhamnosyltransferase | Lipopolysaccharide O antigen | + |
| PGN5 | PGN4ΔaroA | PGN4 + PA3164 | 2.2 | 3-Phoshoshikimate 1-carboxyvinyltransferase | Aromatic amino acids (F, Y and W) | + |

For each deletion, the pEX100T-NotI plasmid carrying its specific insert was introduced into *P. aeruginosa* via triparental conjugation with the helper plasmid pRK2013. The target gene was deleted with a two-step allelic exchange procedure. Briefly, homologous recombination between one site on the plasmid and its target site on the chromosome integrated the plasmid into the *P. aeruginosa* chromosome (i.e., a single-crossover event). Single-crossovers were selected by plasmid-conferred resistance to carbenicillin and sensitivity to 10% (w/v) sucrose supplemented in PIA. Single-crossovers were grown overnight in LB broth to allow for homologous recombination between the second site on the plasmid with its target site on the chromosome (i.e., a double-crossover event), which removes the entire plasmid sequence along with the target gene sequence. Double-crossovers were selected by sensitivity to carbenicillin and resistance to sucrose, indicating that the plasmid sequence had been removed. Sucrose-resistant, carbenicillin-sensitive colonies were sequenced to verify the in-frame gene deletion.

Figure 2:
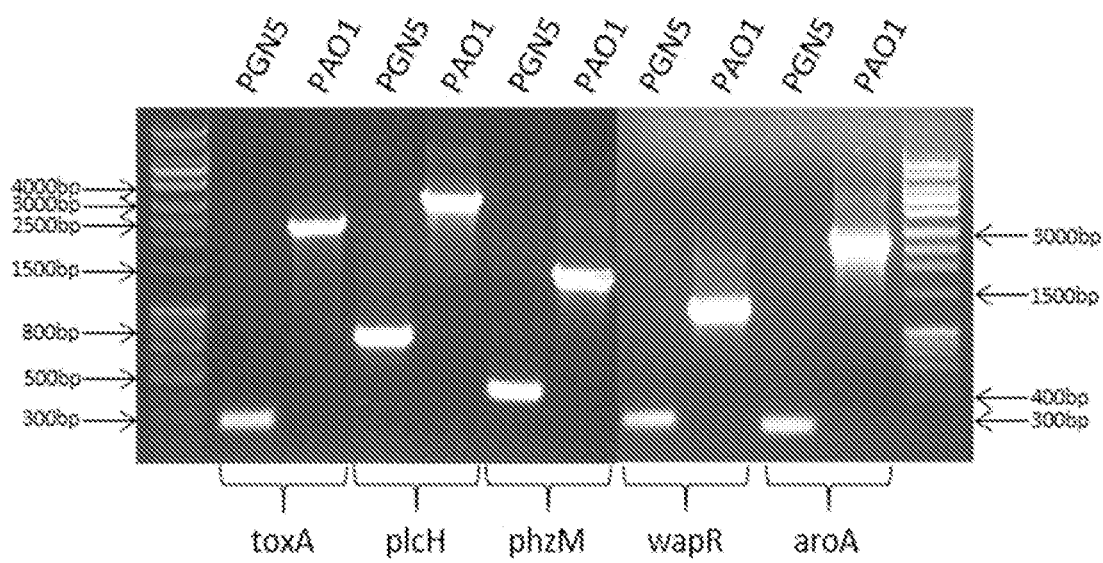
FIG. 2 is an image of a gel showing polymerase chain reaction (PCR) confirmation of the absence of five pathogenic genes in a modified *Pseudomonas* bacterium designated PGN5 and made in accordance with the presently-disclosed subject matter.

Furthermore, the genomes of strains PGN4 and PGN5 were sequenced and annotated with regard to the reference genome *P. aeruginosa* strain PAO1 (GenBank accession AE004091.2). The genomes of strains PGN4 and PGN5 were assigned with GenBank accession numbers CP032541 and CP032541, respectively. The four or five gene deletions for strains PGN4 (ΔtoxA ΔplcH ΔphzM ΔwapR) or PGN5 (ΔtoxA ΔplcH ΔphzM ΔwapR ΔaroA) were all detected in the genome sequences with upstream and downstream flanking sequences of the target genes as in pEX100TNot1 constructs, consistent with the in-frame deletions through the endogenous homologous recombination of bacteria. Each of the in-frame deletions described above was further confirmed by PCR (FIG. 2) using the primers described in Table 4 below.

Example 2—Vaccination with PGN5

Figure 3A:
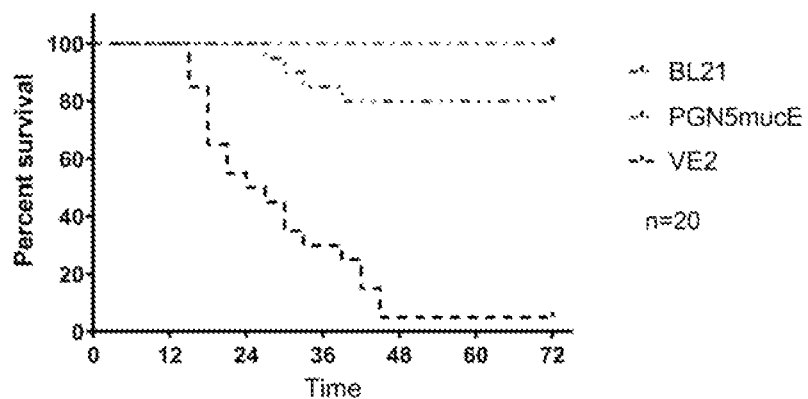
FIGS. 3A-3B include graphs and images showing the results of survival studies in mice conducted using a modified *Pseudomonas* bacterium made in accordance with the presently-disclosed subject matter.
Figure 3B:
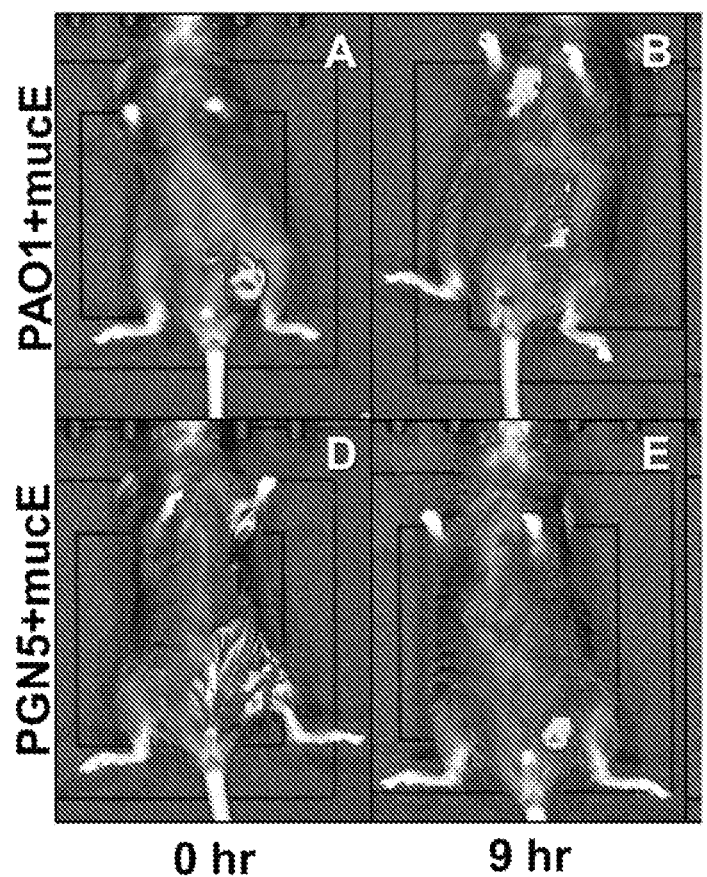

To determine the ability of the modified *Pseudomonas aeruginosa* bacteria described herein to be utilized as a vaccine, a vaccine composition was generated that comprised the above-described attenuated *Pseudomonas aeruginosa* strain PAO1 that was designated PGN5 and which has the O-antigen removed. To test its safety, the PGN5 vaccine was first tested in survival studies against *E. coli* strain BL21. As shown in FIGS. 3A-3B, infection with the BL21 strain killed 20% of mice (20/group), while infection with the PGN5 strain resulted in no deaths.

FIG. 3A shows the combined survival of mice at a concentration of $5\times10^8$ CFUs/mouse. All mice injected with PGN5mucE survived (20/20). 80% of mice injected with BL21 survived (16/20). 5% of mice injected with VE2 survived (1/20). In these studies, a pilot experiment was first performed to estimate the lethal dose of the following bacterial strains: *Escherichia coli* strain BL21, *P. aeruginosa* strain PGN5mucE (mucE plasmid to activate alginate pathway, PGN5 by itself is nonmucoid), and *P. aeruginosa* strain VE2. Bacteria was prepared in stocks of 3 concentrations: $1\times10^9$ CFUs/mL, $1\times10^8$ CFUs/mL, and $1\times10^7$ CFUs/mL. Bacteria was then grown to $OD_{600}$ of 0.6 then centrifuged to pellet and re-suspended to desired concentration in 5% skim milk in PBS. Validation was done including selective growth, PCR testing, and viable cell counts. Stocks were aliquoted into cryovials, flash frozen, and stored at −80° C. until use. On the day of injections, cryovials were slowly thawed in fridge, washed twice with PBS, then re-suspended in PBS and stored on ice until injection. Validation was done at this stage including selective growth, PCR testing, and viable cell counts. Small adjustments to concentration were made based on previous viable growth data. Mice (8-10 week old, C57BL/6; Charles River Laboratories) were then

TABLE 4

PCR Primers used to confirm in frame deletions.

| Deletion | Primers used | Expected PCR product size in PAO1 (bp) | Expected PCR product size in PGN5/6 (bp) |
| --- | --- | --- | --- |
| toxA | toxA forward: AATTCATATTCGATTGGGCTGGCATCAGG (SEQ ID NO: 1)<br>toxA reverse: GTTCGCACATTCACCACTCTGCAATCC (SEQ ID NO: 2) | 2195 | 284 |
| plcH | plcH forward: CAGTTGCTCTTCCTCGCCAGG (SEQ ID NO: 3)<br>plcH reverse: CATGAACAAGTGACCTTTCATTCAGCCGACAAGG (SEQ ID NO: 4) | 2941 | 769 |
| phzM | phzM forward: AACTGGCGCAGGCGGAGACC (SEQ ID NO: 5)<br>phzM reverse: GGATTGCTAAGCTGATGCTTCCTGCAATGC (SEQ ID NO: 6) | 1438 | 448 |
| wapR | wapR forward: AGCCGTTCTGCTAGCCTCGACC (SEQ ID NO: 7)<br>wapR reverse: TGAGAGTAGCAGCCGAAAAGAGCTGG (SEQ ID NO: 8) | 1259 | 374 |
| aroA | aroA forward: GCGAACGCCAACAGCCGATAAAGC (SEQ ID NO: 9)<br>aroA reverse: ATCTGGCTCGCGATGCCGGTCC (SEQ ID NO: 10) | 2548 | 334 | gathered, taken to an injection room, and 5 male mice were injected with 100 µl of each concentration of each strain as well as PBS control. Results show VE2 was lethal to 80% of mice at a concentration of 1×10$^9$ CFUs/mL of 1×10$^8$ CFUs/mouse. All VE2 mice at the two lower concentrations survived. All BL21 and PGN5mucE mice survived at all concentrations showing that these strains are not lethal.

Using the results from the above experiments, the decision was then made to use a concentration that was 10-fold higher to determine lethality in BL21 and PGN5mucE. However, the highest concentration physically achievable was 2.5×10$^9$ CFUs/mL. Therefore, bacteria stocks were prepared the same as in the above experiment at a concentration of 2.5×10$^9$ CFUs/mL. Validation steps were also the same. Bacteria was grown to OD$_{600}$ of 0.6 then centrifuged to pellet and re-suspended to desired concentration in 5% skim milk PBS. Validation was done including selective growth, PCR testing, and viable cell counts. Stocks were aliquoted into cryovials, flash frozen, and stored at −80° C. until use. On day of injections, cryovials were slowly thawed in fridge, washed twice with PBS, then resuspended in PBS and stored on ice until injection. Validation was done at this stage including selective growth, PCR testing, and viable cell counts. Small adjustments to concentration were made based on previous viable growth data. Mice were then gathered, taken to injection room, and 10 male and 10 female mice were injected with 200 ul of each concentration of each strain as well as PBS control. The concentration injected equaled 5×10$^8$ CFUs/mouse. Results show that VE2 was lethal to 100% of male mice and 90% of female mice. BL21 was lethal to 80% of male mice and 80% of female mice. All mice injected with PGN5mucE survived.

FIG. 3B shows images of C57BL/6 mice injected with bioluminescent-labelled *P. aeruginosa* strains. To label the bacterial strain with constitutive expression of bioluminescence, a *Pseudomonas* suicide vector of pUC18-mini-Tn7T-Gm-lux (GmR) was used that carries the luxCDABE operon for insertion into attTn7 sites to integrate into an FRT-flanked gentamicin resistance cassette into a neutral site downstream of the glmS gene in PAO1 and PGN5 (Ref: Choi, K. H., and Schweizer, H. P. (2006) mini-Tn7 insertion in bacteria with single attTn7 sites: example *Pseudomonas aeruginosa*. Nat Protoc 1(1): 153-161). Briefly, electrocompetent PAO1 and PGN5 cells were prepared with 300 mM sucrose and electroporated with the pUC18 mini-Tn7T-Gm-lux and pTNS2 plasmids. Pure stocks were generated from resultant gentamicin-resistant and bioluminescent colonies. The pFLP2 plasmid was used to remove the gentamicin resistance cassette. Final stocks used for mouse injection were PCR-verified, bioluminescent, plasmid-cured, and gentamicin and carbenicillin-sensitive. For mouse injection, stocks were prepared and injected as described above. Mice were imaged on an IVIS Lumina XRMS (PerkinElmer, Waltham, MA, USA) every 6 h for 18 h and monitored for 4 weeks. By 18 h post-injection, bioluminescence was only detected at the injection site of all mice. Panel A and B of FIG. 3B show mice injected with bioluminescent PAO1+mucE at (panel A) 0 h post-injection and (panel B) 9 h post-injection (n=5). Panels C and D of FIG. 3B showing mice injected with bioluminescent PGN5+ mucE at (panel C) 0 h post-injection and (panel D) 9 h post-injection (n=5). Different mice were imaged at each time point to avoid overdose of anaesthetic. Upon injection and over time, PAO1mucE strain spread from the initial injection site to different sites of the body with the highest concentration in the right lung at 9 h. However, PGN5mucE strain was confined to the injection site at 9 h. Over time, the bioluminescence disappeared completely between 24 to 48 h. This result was consistent with the severe attenuation of virulence in PGN5 as shown in FIG. 3A.

Next, to determine vaccine viability, PGN5 was tested against parent PAO1 (Serotype O5) as well as against other Pa serotypes implicated in bovine mastitis (Serotypes O1, O2, O3). Briefly, mice (Male C57BL/6; Charles River) received a vaccine of live PGN5 (10$^8$ cells) at 8-10 weeks old, and then received booster at the same dose 3 weeks after. The mice then received a test pathogen at the dose of 5×10$^8$ cells 10 days following booster. All vaccines and pathogens were delivered via intraperitoneal (IP) injections.

Figure 4:
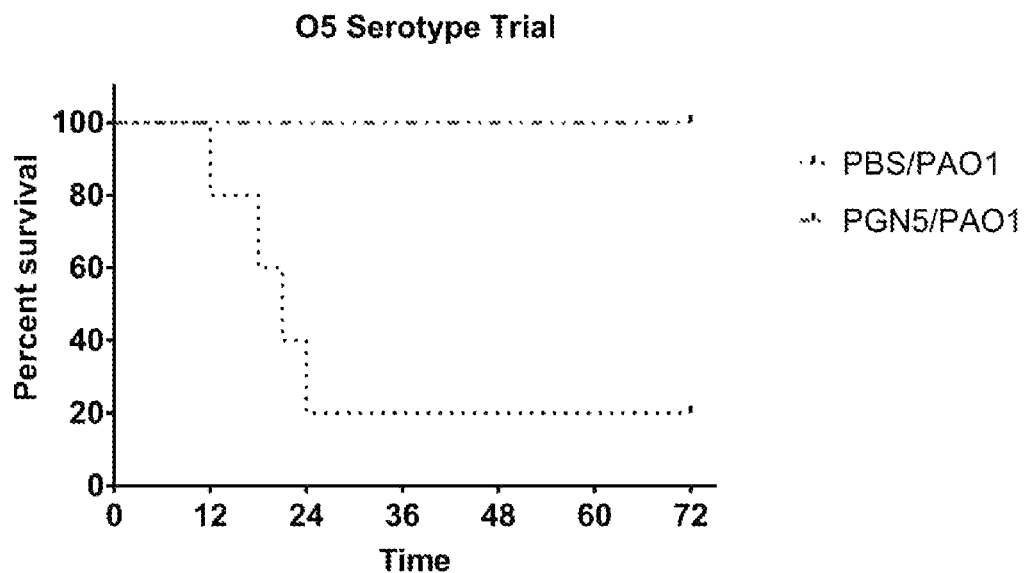
FIG. 4 is a graph showing survival studies conducted using a modified *Pseudomonas* bacterium (PGN5) of the presently-disclosed subject matter as a vaccine against infection with O5 serotype *Pseudomonas aeruginosa* strain PAO1 bacteria.
Figure 5:
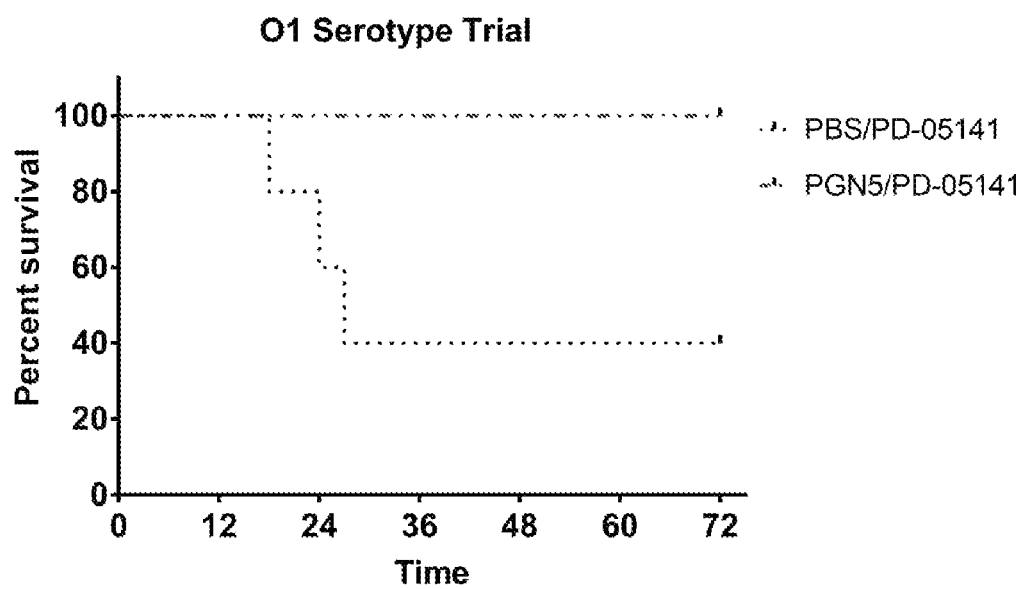
FIG. 5 is a graph showing survival studies conducted using a modified *Pseudomonas* bacterium (PGN5) of the presently-disclosed subject matter as a vaccine against infection with a bovine mastitis isolate O1 serotype *Pseudomonas aeruginosa* strain PD-05141 bacteria.

As shown in FIGS. 4-5, PGN5, which doesn't have the enzyme alpha-1,3-rhamnosyltransferase and which results in missing O polysaccharide antigens and which is severely attenuated due to the in-frame deletions of five pathogenicity genes, was effectively able to be utilized as a live vaccine which cross protects against the O1 and O5 serotypes, and, consequently, is also believed to be effective against other serotypes (O2 and O3). In this regard, and without wishing to be bound by any particular theory or mechanism, it was believed that PGN5 was capable of providing protection against a wide range of serotypes and that the lack of O antigens in PGN5 can provoke a long-term T-cell dependent host response.

In the experiments shown in FIG. 4, C57BL/6 male mice were injected of 200 µL live PGN5 (10$^8$ cells/mL) at 8-10 weeks old, received the same booster dose 3 weeks following the initial injection, and received the test pathogen 5×10$^8$ cells 10 days following booster for challenge. Vaccines and pathogens were all delivered via IP injections. All bacteria were prepared and validated as above and stored at −80° C. until use. The challenge study with the parent strain PAO1 (serotype O5) in FIG. 4 showed 80% mortality in unimmunized mice and no mortality in PGN5 immunized mice (20/group). The challenge study with a bovine mastitis isolate *Pseudomonas aeruginosa* Strain PD-05141 with O1 serotype shown in FIG. 5 resulted in a 60% mortality rate in unimmunized mice and no mortality in PGN5 immunized mice (20/group). These results indicated that immunization with PGN5 strain can cross-protect different serotypes All publications, patents, and patent applications mentioned in this specification are herein incorporated by reference to the same extent as if each individual publication, patent, or patent application was specifically and individually indicated to be incorporated by reference, including the references set forth in the following list:

REFERENCES

1. Bankevich, A., Nurk, S., Antipov, D., Gurevich, A. A., Dvorkin, M., Kulikov, A. S., et al. (2012) SPAdes: A New Genome Assembly Algorithm and Its Applications to Single-Cell Sequencing. Journal of Computational Biology 19(5): 455-477.
2. Choi, K. H., and Schweizer, H. P. (2006) mini-Tn7 insertion in bacteria with single attTn7 sites: example *Pseudomonas aeruginosa*. Nat Protoc 1(1): 153-161.
3. Damron, F. H., Qiu, D., and Yu, H. D. (2009) The *Pseudomonas aeruginosa* sensor kinase KinB negatively controls alginate production through AlgW-dependent MucA proteolysis. J Bacteriol 191(7): 2285-2295.
4. de Kievit, T. R., Dasgupta, T., Schweizer, H., and Lam, J. S. (1995) Molecular cloning and characterization of the rfc gene of *Pseudomonas aeruginosa* (serotype O5). Mol Microbiol 16(3): 565-574.

5. Driscoll, J. A., Brody, S. L., and Kollef, M. H. (2007) The epidemiology, pathogenesis and treatment of *Pseudomonas aeruginosa* infections. Drugs 67(3): 351-368.
6. Essar, D. W., Eberly, L., Hadero, A., and Crawford, I. P. (1990) Identification and characterization of genes for a second anthranilate synthase in *Pseudomonas aeruginosa*: interchangeability of the two anthranilate synthases and evolutionary implications. J Bacteriol 172(2): 884-900.
7. Figurski, D. H., and Helinski, D. R. (1979) Replication of an origin-containing derivative of plasmid RK2 dependent on a plasmid function provided in trans. Proc Natl Acad Sci USA 76(4): 1648-1652.
8. Fomsgaard, A., Freudenberg, M. A., and Galanos, C. (1990) Modification of the silver staining technique to detect lipopolysaccharide in polyacrylamide gels. J Clin Microbiol 28(12): 2627-2631.
9. Gellatly, S. L., and Hancock, R. E. (2013) *Pseudomonas aeruginosa*: new insights into pathogenesis and host defenses. Pathog Dis 67(3): 159-173.
10. Govan, J. R., and Fyfe, J. A. (1978) Mucoid *Pseudomonas aeruginosa* and cystic fibrosis: resistance of the mucoid form to carbenicillin, flucloxacillin and tobramycin and the isolation of mucoid variants in vitro. Journal of Antimicrobial Chemotherapy 4(3): 233-240.
11. Govan, J. R., Fyfe, J. A., and Jarman, T. R. (1981) Isolation of alginate-producing mutants of *Pseudomonas fluorescens, Pseudomonas putida* and *Pseudomonas mendocina*. J Gen Microbiol 125(1): 217-220.
12. Helgerud, T., Gåserød, O., Fjæreide, T., Andersen, P. O., and Larsen, C. K. (2009) Alginates. Food stabilisers, thickeners and gelling agents. A. Imeson. Oxford, Wiley-Blackwell: 50-72.
13. Iglewski, B. H., Liu, P. V., and Kabat, D. (1977) Mechanism of action of *Pseudomonas aeruginosa* exotoxin A adenosine diphosphate-ribosylation of mammalian elongation factor 2 in vitro and in vivo. Infect Immun 15(1): 138-144.
14. Kropinski, A. M., Chan, L. C., and Milazzo, F. H. (1979) The extraction and analysis of lipopolysaccharides from *Pseudomonas aeruginosa* strain PAO, and three rough mutants. Can J Microbiol 25(3): 390-398.
15. Langmead, B., and Salzberg, S. L. (2012) Fast gapped-read alignment with Bowtie 2. Nature Methods 9: 357.
16. Leid, J. G., Willson, C. J., Shirtliff, M. E., Hassett, D. J., Parsek, M. R., and Jeffers, A. K. (2005) The exopolysaccharide alginate protects *Pseudomonas aeruginosa* biofilm bacteria from IFN-gamma-mediated macrophage killing. J Immunol 175(11): 7512-7518.
17. Li, P., Lo, C. C., Davenport, K., and Chain, P. (2018) PanGIA: A Metagenomics Analytical Framework for Routine Biosurveillance in the Clinic and Beyond. In Preparation.
18. Linker, A., and Jones, R. S. (1966) A new polysaccharide resembling alginic acid isolated from pseudomonads. J Biol Chem 241(16): 3845-3851.
19. Liu, F., Wang, X., Shi, H., Wang, Y., Xue, C., and Tang, Q. J. (2017) Polymannuronic acid ameliorated obesity and inflammation associated with a high-fat and high-sucrose diet by modulating the gut microbiome in a murine model. Br J Nutr 117(9): 1332-1342.
20. Liu, P. V. (1966) The roles of various fractions of *Pseudomonas aeruginosa* in its pathogenesis. 3. Identity of the lethal toxins produced in vitro and in vivo. J Infect Dis 116(4): 481-489.
21. Lyczak, J. B., Cannon, C. L., and Pier, G. B. (2002) Lung infections associated with cystic fibrosis. Clin Microbiol Rev 15(2): 194-222.
22. Michalska, M., and Wolf, P. (2015) *Pseudomonas* Exotoxin A: optimized by evolution for effective killing. Front Microbiol 6: 963.
23. Moradali, M. F., Donati, I., Sims, I. M., Ghods, S., and Rehm, B. H. (2015) Alginate Polymerization and Modification Are Linked in *Pseudomonas aeruginosa*. MBio 6(3): e00453-00415.
24. Mortazavi-Jahromi, S. S., Alizadeh, S., Javanbakht, M. H., and Mirshafiey, A. (2018) Anti-diabetic effect of beta-D-mannuronic acid (M2000) as a novel NSAID with immunosuppressive property on insulin production, blood glucose, and inflammatory markers in the experimental diabetes model. Arch Physiol Biochem: 1-6.
25. Nivens, D. E., Ohman, D. E., Williams, J., and Franklin, M. J. (2001) Role of alginate and its O acetylation in formation of *Pseudomonas aeruginosa* microcolonies and biofilms. J Bacteriol 183(3): 1047-1057.
26. Pedersen, S. S., Kharazmi, A., Espersen, F., and Hoiby, N. (1990) *Pseudomonas aeruginosa* alginate in cystic fibrosis sputum and the inflammatory response. Infect Immun 58(10): 3363-3368.
27. Priebe, G. P., Brinig, M. M., Hatano, K., Grout, M., Coleman, F. T., Pier, G. B., and Goldberg, J. B. (2002) Construction and characterization of a live, attenuated aroA deletion mutant of *Pseudomonas aeruginosa* as a candidate intranasal vaccine. Infect Immun 70(3): 1507-1517.
28. Qiu, D., Eisinger, V. M., Rowen, D. W., and Yu, H. D. (2007) Regulated proteolysis controls mucoid conversion in *Pseudomonas aeruginosa*. Proc Natl Acad Sci USA 104(19): 8107-8112.
29. Rada, B., and Leto, T. L. (2013) Pyocyanin effects on respiratory epithelium: relevance in *Pseudomonas aeruginosa* airway infections. Trends Microbiol 21(2): 73-81.
30. Rocchetta, H. L., Burrows, L. L., Pacan, J. C., and Lam, J. S. (1998) Three rhamnosyltransferases responsible for assembly of the A-band D-rhamnan polysaccharide in *Pseudomonas aeruginosa*: a fourth transferase, WbpL, is required for the initiation of both A-band and B-band lipopolysaccharide synthesis. Mol Microbiol 28(6): 1103-1119.
31. Schwarzmann, S., and Boring, J. R. (1971) Antiphagocytic Effect of Slime from a Mucoid Strain of *Pseudomonas aeruginosa*. Infect Immun 3(6): 762-767.
32. Schweizer, H. P., and Hoang, T. T. (1995) An improved system for gene replacement and xylE fusion analysis in *Pseudomonas aeruginosa*. Gene 158(1): 15-22.
33. Seemann, T. (2014) Prokka: rapid prokaryotic genome annotation. Bioinformatics 30(14): 2068-2069.
34. Tatnell, P. J., Russell, N. J., Govan, J. R., and Gacesa, P. (1996) Characterisation of alginates from mucoid strains of *Pseudomonas aeruginosa*. Biochem Soc Trans 24(3): 404S.
35. Vold, I. M., Kristiansen, K. A., and Christensen, B. E. (2006) A study of the chain stiffness and extension of alginates, in vitro epimerized alginates, and periodate-oxidized alginates using size-exclusion chromatography combined with light scattering and viscosity detectors. Biomacromolecules 7(7): 2136-2146.
36. Winsor, G. L., Griffiths, E. J., Lo, R., Dhillon, B. K., Shay, J. A., and Brinkman, F. S. (2016) Enhanced annotations and features for comparing thousands of *Pseudomonas* genomes in the *Pseudomonas* genome database. Nucleic Acids Res 44(D1): D646-653.

37. International Patent Application No. PCT/US19/22330.

It will be understood that various details of the presently disclosed subject matter can be changed without departing from the scope of the subject matter disclosed herein. Furthermore, the foregoing description is for the purpose of illustration only, and not for the purpose of limitation.

What is claimed is:

1. A method of treating a *Pseudomonas aeruginosa* bacterial infection, comprising administering to a subject a vaccine including a modified *Pseudomonas aeruginosa* bacterium missing or deficient in exotoxin A, hemolytic phospholipase C, phenazine-specific methyltransferase, alpha-1,3-rhamnosyltransferase, and 3-phosphoshikimate 1-carboxyvinyltransferase,
wherein the *Pseudomonas aeruginosa* bacterial infection is an O5-serotype or O1-serotype *Pseudomonas aeruginosa* bacterial infection.

2. The method of claim 1, wherein administering the modified *Pseudomonas aeruginosa* bacterium comprises intraperitoneally administering the modified *Pseudomonas aeruginosa* bacterium.

3. The method of claim 1, wherein the modified *Pseudomonas aeruginosa* bacterium is a live bacterium.

4. The method of claim 1, wherein administering the modified *Pseudomonas aeruginosa* bacterium comprises administering a first dose of the modified *Pseudomonas aeruginosa* bacterium at a first time point and a second dose of the modified *Pseudomonas aeruginosa* bacterium at a second time point.

5. The method of claim 1, wherein the *Pseudomonas aeruginosa* bacterial infection is bovine mastitis.

6. The method of claim 1, wherein administering the modified *Pseudomonas aeruginosa* bacterium comprises administering the modified *Pseudomonas aeruginosa* bacterium subsequent to an onset of the *Pseudomonas aeruginosa* bacterial infection.

7. The method of claim 1, wherein administering the modified *Pseudomonas aeruginosa* bacterium comprises administering the modified *Pseudomonas aeruginosa* bacterium with an adjuvant.

8. A method of eliciting an immune response, comprising administering to a subject a vaccine including a modified *Pseudomonas aeruginosa* bacterium missing or deficient in exotoxin A, hemolytic phospholipase C, phenazine-specific methyltransferase, alpha-1,3-rhamnosyltransferase, and 3-phosphoshikimate 1-carboxyvinyltransferase.

9. The method of claim 8, wherein administering the modified *Pseudomonas aeruginosa* bacterium comprises intraperitoneally administering the modified *Pseudomonas aeruginosa* bacterium.

10. The method of claim 8, wherein the modified *Pseudomonas aeruginosa* bacterium is a live bacterium.

11. The method of claim 8, wherein administering the modified *Pseudomonas aeruginosa* bacterium comprises administering a first dose of the modified *Pseudomonas*

*aeruginosa* bacterium at a first time point and a second dose of the modified *Pseudomonas aeruginosa* bacterium at a second time point.

12. The method of claim 8, wherein administering the modified *Pseudomonas aeruginosa* bacterium comprises administering the modified *Pseudomonas aeruginosa* bacterium subsequent to an onset of a *Pseudomonas aeruginosa* bacterial infection.

13. The method of claim 8, wherein administering the modified *Pseudomonas aeruginosa* bacterium comprises administering the modified *Pseudomonas aeruginosa* bacterium with an adjuvant.

\* \* \* \* \*

```
                              SEQUENCE LISTING

<160> NUMBER OF SEQ ID NOS: 10

<210> SEQ ID NO 1
<211> LENGTH: 29
<212> TYPE: DNA
<213> ORGANISM: Artificial Sequence
<220> FEATURE:
<223> OTHER INFORMATION: PCR Primer

<400> SEQUENCE: 1
aattcatatt cgattgggct ggcatcagg                                           29

<210> SEQ ID NO 2
<211> LENGTH: 27
<212> TYPE: DNA
<213> ORGANISM: Artificial Sequence
<220> FEATURE:
<223> OTHER INFORMATION: PCR Primer

<400> SEQUENCE: 2
gttcgcacat tcaccactct gcaatcc                                             27

<210> SEQ ID NO 3
<211> LENGTH: 21
<212> TYPE: DNA
<213> ORGANISM: Artificial Sequence
<220> FEATURE:
<223> OTHER INFORMATION: PCR Primer

<400> SEQUENCE: 3
cagttgctct tcctcgccag g                                                   21

<210> SEQ ID NO 4
<211> LENGTH: 34
<212> TYPE: DNA
<213> ORGANISM: Artificial Sequence
<220> FEATURE:
<223> OTHER INFORMATION: PCR Primer

<400> SEQUENCE: 4
catgaacaag tgacctttca ttcagccgac aagg                                     34

<210> SEQ ID NO 5
<211> LENGTH: 20
<212> TYPE: DNA
<213> ORGANISM: Artificial Sequence
<220> FEATURE:
<223> OTHER INFORMATION: PCR Primer

<400> SEQUENCE: 5
aactggcgca ggcggagacc                                                     20

<210> SEQ ID NO 6
<211> LENGTH: 30
<212> TYPE: DNA
<213> ORGANISM: Artificial Sequence
<220> FEATURE:
<223> OTHER INFORMATION: PCR Primer

<400> SEQUENCE: 6
ggattgctaa gctgatgctt cctgcaatgc                                          30
```

-continued

```
<210> SEQ ID NO 7
<211> LENGTH: 22
<212> TYPE: DNA
<213> ORGANISM: Artificial Sequence
<220> FEATURE:
<223> OTHER INFORMATION: PCR Primer

<400> SEQUENCE: 7
agccgttctg ctagcctcga cc                                                  22

<210> SEQ ID NO 8
<211> LENGTH: 26
<212> TYPE: DNA
<213> ORGANISM: Artificial Sequence
<220> FEATURE:
<223> OTHER INFORMATION: PCR Primer

<400> SEQUENCE: 8
tgagagtagc agccgaaaag agctgg                                              26

<210> SEQ ID NO 9
<211> LENGTH: 24
<212> TYPE: DNA
<213> ORGANISM: Artificial Sequence
<220> FEATURE:
<223> OTHER INFORMATION: PCR Primer

<400> SEQUENCE: 9
gcgaacgcca acagccgata aagc                                                24

<210> SEQ ID NO 10
<211> LENGTH: 22
<212> TYPE: DNA
<213> ORGANISM: Artificial Sequence
<220> FEATURE:
<223> OTHER INFORMATION: PCR Primer

<400> SEQUENCE: 10
atctggctcg cgatgccggt cc                                                  22
```